United States Patent Office 2,895,933
Patented July 21, 1959

2,895,933

MASTICATING AND SOFTENING AGENT FOR RUBBER AND A PROCESS OF MAKING THE SAME

Konrad Höpfner and Ernst Götte, Dusseldorf, Germany, assignors to Dehydag, Deutsche Hydrierwerke G.m.b.H., Dusseldorf, Germany, a company of Germany No Drawing. Application June 8, 1954
Serial No. 435,358

10 Claims. (Cl. 260—23.7)

This invention relates to improved masticating and softening agents for rubber and rubber substitutes and more particularly to improved masticating and softening agents, for compounding rubber and rubber substitutes, of the type of electroneutral organic salts, and to a process of making the same.

Rubber for most purposes is compounded with various materials, such as fillers, reinforcing agents, pigments, antioxidants, and other materials which are added thereto to improve the properties of the final rubber goods. Such fillers and other additives are incorporated into rubber composition and intimately distributed therethrough by mastication. However, such intimate rubber compounding is rather difficult due to the high tenacity of rubber and requires considerable time. Attempts have been made to facilitate the incorporation and distribution of fillers and like additive materials into rubber compositions and to shorten the time required to intimately and uniformly incorporate said materials therein by adding so-called masticating and softening agents thereto. Said attempts in the past, however, were only partially successful.

The present invention has as its primary object to overcome the difficulties and disadvantages inherent in prior masticating and softening agents and to provide new improved masticating and softening agents with properties superior to those of known agents of said type.

Another object of the invention is to provide an improved process for compounding rubber material for the manufacture of rubber articles whereby the masticating and softening step is materially simplified and shortened, and the subsequent addition of finely divided fillers, pigments and other additives can be carried out without the occurrence of dusting.

Another object of the invention is to provide rubber articles which have an improved resistance to abrasion.

Another object of the invention is to provide a simple and effective process of producing new and improved masticating and softening agents.

Still another object of the invention is to provide masticating and softening agents which reduce or completely eliminate "dusting" during admixture of finely divided fillers, pigments and other additives with the rubber material.

Various other objects and advantages of the invention will become apparent as the description proceeds.

In practicing our invention, we employ electroneutral organic salts as masticating and softening agents for natural rubber, reclaimed rubber, various types of synthetic rubber, and rubber substitutes. Said electroneutral organic salts are obtained by reacting equimolecular amounts of anionic surface-active and cationic surface-active compounds.

The addition of such electroneutral organic salts considerably facilitates mastication and shortens its duration. By their use the rubber composition softens and acquires a certain stickiness which is of advantage in further processing. The addition of said electroneutral organic salts according to the present invention also has a very favorable effect on the incorporation and distribution of conventional rubber additives in the rubber composition, especially of reinforcing agents and pigments, such as carbon black, zinc oxide, finely dispersed silicon dioxide, silica gel, calcium and aluminum silicate dispersions, and other known and commonly used rubber fillers and additives.

The electroneutral organic salts which are suitable for use according to the present invention are produced from cationic surface-active onium compounds, such as, for instance, ammonium, sulfonium, phosphonium compounds and the like. Preferably, said onium compounds have at least one aliphatic, cycloaliphatic, aliphatic-aromatic, or cyclo-aliphatic-aromatic radical with at least 6 carbon atoms in their molecule. Such a radical may comprise up to about 20 and even more carbon atoms. The hydrocarbon radicals of said compounds may also contain hetero atoms or groups of hetero atoms or substituents.

Particularly applicable in the present invention are ammonium compounds derived from ammonia or organic nitrogen bases, such as, for example, trimethyl octyl ammonium chloride, trimethyl dodecyl ammonium chloride, trimethyl octadecyl ammonium methosulfate, dimethyl dioctadecyl ammonium chloride, dimethyl dodecyl benzyl ammonium chloride, dimethyl cyclohexyl higher alkyl ammonium chlorides comprising higher alkyl radicals with 10 to 22 carbon atoms or mixtures of such ammonium chlorides, dodecyl pyridinium chloride, hexadecyl pyridinium bisulfate, and the like. However, other types of onium compounds, such as, for example, trialkylsulfonium salts, tetraalkylphosphonium salts as well as corresponding alkylarsonium and alkylstibonium compounds, are also usable. A few representative examples of the various above-mentioned onium compounds are dimethyloctylsulfonium chloride, dimethyldodecylsulfonium chloride, dimethyloctadecylsulfonium chloride, trimethyloctylphosphonium chloride, triethyloctadecylphosphonium chloride, and the corresponding arsonium and stibonium chlorides. The alkyl radicals of these onium salts may contain hetero atoms, such as oxygen, sulfur or nitrogen, or groups of hetero atoms or substituents.

Anionic surface-active compounds useful as the other reaction component in the production of electroneutral salts according to the present invention are compounds of the aliphatic, cycloaliphatic, aliphatic-aromatic, or cycloaliphatic-aromatic series which have in their molecule preferably at least one radical with at least 6 carbon atoms and up to 20 and more carbon atoms and at least one acid, salt-forming group, such as, for example, a sulfuric acid radical, sulfonic acid radical, carboxylic acid radical, the disulfimide radical ($-SO_2.NH_2SO_2$), or the carbosulfimide radical ($CO.NH.SO_2$), said salt-forming group being neutralized by inorganic or organic bases capable of forming water-soluble salts. Illustrative compounds of this type are, for instance, alkyl sulfates, alkyl sulfonates, alkyl benzene sulfonates, salts of sulfonated oils and fats, salts of dialkyl or dialkyl aryl disulfimides or sulfocarboximides, salts of fatty acids, salts of condensation products of higher molecular carboxylic acid halogenides or sulfonic acid halogenides with proteinic compounds and the like, hydrocarbon radicals, which may be interrupted by hetero atoms, such as oxygen, sulfur or nitrogen, or by groups of hetero atoms, such as ester, carboxamide, or sulfonamide groups and the like, or which may contain substituents, such as hydroxyl, mercapto, amino groups and the like.

Other anionic surface-active compounds which are useful as starting components for the production of electroneutral salts according to the present invention are, for instance, the water-soluble salts of higher molecular fatty acids with at least 6 carbon atoms, wax acids, naphthenic acids, resin acids, octyloxy acetic acid, hexadecyl mercapto acetic acid, C-alkyl cresoxy acetic acid, the water-soluble salts of compounds containing inorganic acid groups, such as dodecyl sulfuric acid esters, the sulfuric acid ester mixture of a mixture of fatty alcohols obtained by catalytic reduction of coconut oil, oleyl sulfuric acid ester, the sulfuric acid ester of ethylene glycol mono-octyl ether, the mono- or disulfuric acid ester of glycerol monostearic acid ester, the phosphoric acid ester of decanediol mono-acetate, the ω-butyl ether of decyl sulfuric acid ester, the ω-hexyl thioether of octyl thiosulfuric acid ester, the N-butyl-N-dodecyl sulfamic acid, the sulfuric acid ester of β-hydroxy-γ-(secondary octyl cresoxy) propane, the secondary octyl phenoxy ethane sulfuric acid ester, N-oleoyl-N-methyl amino ethane-β-sulfonic acid stearoyloxy ethane-β-sulfonic acid, N-cetyl sulfone sulfanilic acid, ω-cyclohexyl ether of decane sulfonic acid, secondary octyl phenyl benzyl ether-4'-sulfonic acid, the water-soluble salts of alkyl benzene sulfonic acids with alkyl radicals having between about 6 and about 18 carbon atoms, the mixture of isomer 2-isoalkyl cresoxy benzoic acid sulfonic acids-5 with alkyl residues having between about 5 and about 11 carbon atoms, 1-secondary octyl phenoxy benzene-2,5-disulfonic acid, 1-secondary hexyl phenoxy-2-(acetylamino) benzene-4-sulfonic acid, the sulfonation product of secondary octyl-1-cresyl benzyl ether, the sulfonation product of cresoxy acetic acid dodecylamide, and the like.

The electroneutral salts according to the present invention are produced from such cationic and anionic surface-active compounds, for instance, by precipitating equimolecular amounts of the anionic surface-active components and the cationic surface-active components from their aqueous solutions in contact with each other. The hydrocarbon radicals of both components may be of the same or of different composition. The precipitated compounds can be used directly for the purpose of the present invention or they may be first purified, freed of contaminating salt content, and dried. In certain specific instances, for example with aqueous suspensions of rubber latex, it is also possible to use, in place of said electroneutral salts, mixtures of equimolecular amounts of their starting components which have not been precipitated in the above-described manner. Furthermore, it is possible to employ electroneutral salts that contain components which are of special importance for further processing and working up of the rubber composition, such as, for instance, sulfurized anionic surface-active compounds and the like.

The electroneutral organic salts according to the present invention can be added as such to the rubber composition or in the form of solutions or dispersions in water or organic solvents. They may also be used together with known plasticizers.

The amounts of electroneutral salts to be added are at least 0.5% and may be 30% and even higher, calculated on the basis of the rubber content of the composition. Preferably, amounts between about 5% and about 20% are added. Known plasticizers which may additionally be used are, for instance, esters, such as dibutyl phthalate, dioctyl phthalate, tricresyl phosphate, triacetin, acylic or cyclic hydrocarbons, such as mineral oils, tetrahydronaphthalene, decahydro naphthalene, fatty materials, such as lauric acid, stearic acid, factice, tar distillation products, such as pine tar and the like.

Masticating and softening agents according to the present invention are compounded with rubber compositions preferably by first mixing and masticating said electroneutral salts, and preferably with the addition of known plasticizers, until the rubber has attained the desired plasticity, after which the other ingredients, such as vulcanization accelerators, antioxidants, sulfur, and the above-mentioned fillers and pigments are incorporated thereinto. Rubber may also be used in the form of aqueous emulsions, for instance in the form of natural rubber latex, or of emulsions in other liquids, and the electroneutral salts according to the present invention, preferably also in the form of emulsions, may be admixed therewith. Subsequently the mixture is caused to precipitate and is further worked up. Vulcanization of the compounded rubber compositions is carried out in a manner known in the art.

We have also found that, when the rubber material is masticated and softened with the above-described organic electroneutral salts, the undesirable dust formation during the subsequent admixture of finely divided fillers and pigments, or other additives, is completely eliminated, due possibly to the dissipation of all electrical charges from these fillers. Moreover, the rubber products produced from rubber material masticated and softened with the agents of the present invention have been found to have a superior resistance to abrasion.

The following examples serve to illustrate our invention without, however, limiting the same thereto.

*Example I*

20 parts by weight of the electroneutral organic salt prepared from equimolecular amounts of dimethyl cyclohexyl dodecyl ammonium chloride and dodecyl sodium sulfate, and 10 parts by weight of dioctyl phthalate are compounded with 130 parts by weight of (smoked sheets) crude rubber by means of mixing rollers until a homogeneous mass is obtained. Said mass is then gradually compounded with 65 parts by weight of alumina gel and subsequently with 1.3 parts by weight of mercapto benzothiazole, 7 parts by weight of zinc oxide, 2 parts by weight of stearic acid, and 2 parts by weight of sulfur. Said rubber composition can be very readily masticated and compounded. All its ingredients can be homogeneously incorporated therein within a shorter period of time than they can be incorporated without the use of said electroneutral salts. As soon as the mixture is completely homogenized, it is vulcanized in the conventional manner.

*Example II*

Instead of the electroneutral salts used in Example I, a corresponding amount of the electroneutral salt made from equimolecular amounts of dimethyl-cyclohexyl-hexadecyl-ammonium chloride and sodium stearate was used. The resulting improvements were the same.

*Example III*

Instead of the electroneutral salt employed in Example I, a corresponding amount of the electroneutral salt made from octadecyloxy-carbomethyl-pyridinium chloride and sodium oleate was used. The results were the same.

*Example IV*

100 parts by weight of a butadiene-styrene mixed polymerization product and 25 parts by weight of regenerated rubber were worked on a mixing roller with 15 parts by weight of the electroneutral salt made from equimolecular amounts of dimethyl-dioctadecyl-ammonium chloride and dodecylsodium sulfate until the mixture was homogeneous. Thereafter this mass was mixed with 65 parts of carbon black, 1.3 parts by weight of mercaptobenzthiazole, 5 parts by weight of tin oxide, 2 parts by weight of stearic acid, and 1.5 parts by weight of sulfur, and then vulcanized in the usual manner. The filler materials were worked into this mass without dusting and resulted in a vulcanized product possessing improved resistance to abrasion.

*Example V*

Instead of the electroneutral salt employed in Example IV, a corresponding amount of the electroneutral salt made from equimolecular amounts of methyl-octadecyl-piperidinium chloride and sulfonated oleylsodium sulfate was used with otherwise the same polymerization product and fillers. The results were the same.

Example VI

In place of the electroneutral salts in Example IV, a corresponding amount of the electroneutral salt made from dimethyl-dodecylsulfonium-methosulfate and decyl-sodium sulfate was used with the same rubber-like synthetic compound and the same fillers. The results were the same.

Example VII 150 parts by volume of an approximately 60% latex concentrate were worked in the usual manner into 1.8 parts by weight of sulfur paste (50% sulfur), 1 part by weight of zinc oxide, 0.3 part by weight of pentamethyl-enedithio-carbamic acid piperidine, and 9 parts by weight of the electroneutral salt made from equimolecular amounts of triethyl-hexadecylammonium chloride and di-dodecyl-disulfimide sodium. Thereafter, 30% by weight of finely divided china clay was added to this mixture without the occurrence of dusting. The resulting mixture, after being subjected to the dipping process, was formed into various rubber articles and finally vulcanized. The vulcanized objects thus produced possessed good mechanical characteristics.

Example VIII

In place of the electroneutral salt employed in Example VII, a corresponding amount of the electroneutral salt made from equimolecular amounts of triethyl-octa-decylammonium chloride and a mixture of the sodium salts of mono- and didodecyl-phosphate was used in the same latex-filler composition with substantially the same results.

Example IX

In place of the electroneutral salts employed in Example VIII, the electroneutral salt made from equimolecular amounts of trimethylhexadecyl-phosphonium chloride and dodecylbenzosulfonic acid sodium was used in the same latex-filler composition with substantially the same results.

While we have given several examples of the practice of our invention to better illustrate the same, it will be understood that various changes and departures from the illustrative examples will be obvious to persons skilled in the art and that the practice of our invention is not limited to the specific examples given, and that the following claims are intended to cover various ways of applying the principles of our invention to rubber compounding.

We claim:

1. A composition of matter comprising a rubber material selected from the group consisting of natural rubber, butadiene-styrene synthetic rubber and reclaimed rubber, and as a softening and masticating agent, at least 0.5% by weight, based on the weight of rubber of a water-insoluble organic salt precipitate obtained by adding together an aqueous solution of an organic cationic surface-active onium compound selected from the group consisting of quaternary ammonium compounds, quaternary phosphonium compounds and tertiary sulfonium compounds and having at least one aliphatic hydrocarbon radical containing 6 to 22 carbon atoms and an aqueous solution of an organic anionic surface-active compound having at least one aliphatic hydrocarbon radical containing 6 to 22 carbon atoms and at least one acid radical capable of being neutralized by an organic base to form a salt therewith selected from the group consisting of sulfuric acid radicals, sulfonic acid radicals, phosphoric acid radicals and carboxylic acid radicals, said cationic and said anionic compounds being in substantially equimolar proportions in said precipitate.

2. A composition of matter comprising a rubber material selected from the group consisting of natural rubber, butadiene-styrene synthetic rubber and reclaimed rubber and, as a masticating and softening agent, from 5 to 30% by weight, based on the weight of rubber material of a water-insoluble organic salt precipitate obtained by adding together an aqueous solution of an organic cationic surface-active onium compound selected from the group consisting of quaternary ammonium compounds, quaternary phosphonium compounds and tertiary sulfonium compounds and having at least one aliphatic hydrocarbon radical containing 6 to 22 carbon atoms and an aqueous solution of an organic anionic surface-active compound having at least one aliphatic hydrocarbon radical containing 6 to 22 carbon atoms and at least one acid radical capable of bein neutralized by an organic base to form a salt therewith selected from the group consisting of sulfuric acid radicals, sulfonic acid radicals, phosphoric acid radicals and carboxylic acid radicals, said cationic and said anionic compounds being in substantially equimolar proportions in said precipitate.

3. A composition of matter comprising a rubber material selected from the group consisting of natural rubber, butadiene-styrene synthetic rubber and reclaimed rubber and as a masticating and softening agent, from 5 to 30% by weight, based on the weight of rubber material of a water-insoluble organic salt precipitate formed by adding together an aqueous solution of a cationic tri-alkyl-cyclohexyl-ammonium halide wherein one of said alkyl radicals contains 6 to 22 carbon atoms, and an aqueous solution of an anionic alkali metal salt of an alkyl sulfate with 6 to 22 carbon atoms in the alkyl radical, said cationic and said anionic compounds being in substantially equimolar proportions in said precipitate.

4. A composition of matter comprising a rubber material selected from the group consisting of natural rubber, butadiene-styrene synthetic rubber and reclaimed rubber, and as a masticating and softening agent, from 5 to 30% by weight, based on the weight of rubber material of a water-insoluble organic salt precipitate obtained by adding together an aqueous solution of dimethyl-dodecyl-cyclohexyl-ammonium chloride and an aqueous solution of an alkali metal salt of a higher fatty acid, said cationic and said anionic compounds being in substantially equimolar proportions in said precipitate.

5. A composition of matter comprising a rubber material selected from the group consisting of natural rubber, butadiene-styrene synthetic rubber and reclaimed rubber and, as a masticating and softening agent, from 5 to 30% by weight based on the weight of rubber material, of a water-insoluble organic salt precipitate formed by adding together an aqueous solution of cationic dimethyl-cyclohexyl-dodecyl-ammonium chloride and an aqueous solution of anionic dodecyl-sodium sulfate, said cationic and said anionic compounds being in substantially equimolar proportions in said precipitate.

6. A composition of matter comprising a rubber material selected from the group consisting of natural rubber, butadiene-styrene synthetic rubber and reclaimed rubber and, as a masticating and softening agent, from 5 to 30% by weight, based on the weight of rubber material, of a water-insoluble organic salt precipitate formed by adding together an aqueous solution of a cationic dialkyl pyridinium halide and an aqueous solution of an anionic water-soluble higher fatty acid salt, said cationic and said anionic compounds being in substantially equimolar proportions in said precipitate.

7. In a process of compounding rubber compositions from a rubber material selected from the group consisting of natural rubber, butadiene-styrene synthetic rubber and reclaimed rubber with a masticating and softening agent, the improvement which comprises incorporating into said rubber compositions as said agent at least 0.5% by weight of said rubber material of a water-insoluble organic salt precipitate obtained by adding together an aqueous solution of an organic cationic surface-active onium compound selected from the group consisting of quaternary ammonium compounds, quaternary phosphonium compounds and tertiary sulfonium compounds and having at least one aliphatic hydrocarbon radical containing 6 to 22 carbon atoms and an aqueous solution of an organic anionic surface-active compound having at least one aliphatic hydrocarbon radical containing 6 to 22 carbon atoms and at least one acid radical capable of being neutralized by an organic base to form a salt therewith selected from the group consisting of sulfuric acid radicals, sulfonic acid radicals, phosphoric acid radicals and carboxylic acid radicals, said cationic and said anionic compounds being in substantially equimolar proportions in said precipitate.

8. The process of claim 7 wherein said rubber material is a solid rubbery material.

9. The process of claim 7 wherein said rubber material is in an aqueous emulsion.

10. In a process of compounding rubber compositions from a rubber material selected from the group consisting of natural rubber, butadiene-styrene synthetic rubber and reclaimed rubber with a masticating and softening agent, the improvement which comprises incorporating into said rubber compositions as said agent from 5% to 30% by weight of said rubber material of a water-insoluble organic salt precipitate obtained by adding together an aqueous solution of dimethyl-dodecyl-cyclohexyl-ammonium chloride and an aqueous solution of an alkali metal salt of a higher fatty acid, said cationic and said anionic compounds being in substantially equimolar proportions in said precipitate.

References Cited in the file of this patent

UNITED STATES PATENTS

| | | |
|---|---|---|
| 2,189,664 | Katzman | Feb. 6, 1940 |
| 2,313,154 | Kelly et al. | Mar. 9, 1943 |
| 2,360,990 | Van Valkenburgh | Oct. 24, 1944 |
| 2,373,173 | Dean | Apr. 10, 1945 |
| 2,388,618 | Omansky | Nov. 6, 1945 |
| 2,457,335 | Williams et al. | Dec. 28, 1948 |

FOREIGN PATENTS

| | | |
|---|---|---|
| 426,745 | Great Britain | Apr. 9, 1935 |
| 663,407 | Great Britain | Dec. 19, 1951 |
| 153,638 | Australia | Oct. 15, 1953 |

OTHER REFERENCES

Hackh's Chemical Dictionary, 3rd edition, page 594, "Onium . . ." (Copy in Scientific Library.)

India Rubber World, vol. III, No. 1, October 1944 page 59. (Copy in Patent Office Library.)